June 28, 1932.  S. RUBEN  1,865,213
ELECTRIC CURRENT RECTIFIER
Filed Dec. 10, 1924
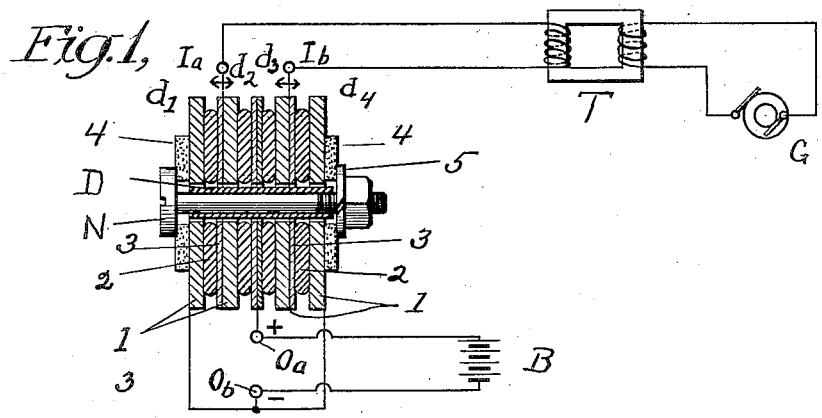
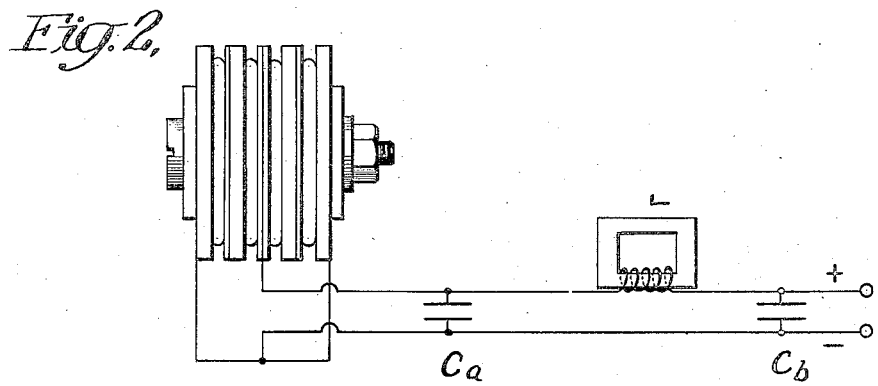
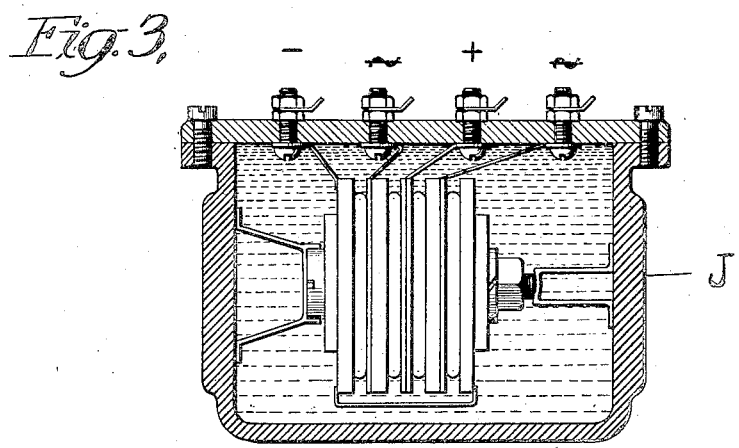
Inventor
SAMUEL RUBEN
By his Attorney Patented June 28, 1932

1,865,213

UNITED STATES PATENT OFFICE

SAMUEL RUBEN, OF NEW YORK, N. Y., ASSIGNOR, BY MESNE ASSIGNMENTS, TO RUBEN RECTIFIER CORPORATION OF DELAWARE

ELECTRIC CURRENT RECTIFIER

Application filed December 10, 1924. Serial No. 754,956.

This invention relates to electric current rectifiers and the like and particularly to electrode elements which are adapted to provide an asymmetric couple of the dry surface-contact variety.

The object generally of the invention is to provide a device of this character which is economical, efficient and readily manufactured.

More specifically an object of the invention is to provide an arrangement of electrode elements which is adapted for high duty service in rectification and the like when one element has a particular composition, or specifically when the electronegative element is a metallic oxide. In such cases the electropositive element is preferably oxide coated.

Another object is to provide a method for producing such oxide-coated electropositive elements.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

The present application is a continuation in part of my prior copending applications Serial No. 739,188, filed September 22, 1924, now Patent 1,649,741; and Serial No. 750,539, filed November 18, 1924, now Patent 1,649,742.

For a fuller understanding of the nature and objects of the invention reference should be had to the following detailed description taken in connection with the accompanying drawing, in which:

Fig. 1 is a sectional view of a rectifying device connected in a battery-charging circuit;

Fig. 2 is a diagrammatic view of a rectifying device connected in a filter circuit; and Fig. 3 shows a rectifying device immersed in an oil bath.

In a device of this character having an electrode composed of an electropositive material, such as aluminum, and a cooperating electrode of an electronegative material, such as an electrically conductive metallic oxide, for instance, current flows only when the former electrode is negatively charged, the contacting elements thus forming a rectifier couple or unit. An electrode composed of aluminum amalgam gives good rectifying effects when used in combination with an electrically conductive metallic oxide, but does not readily withstand continuous usage, because of the reaction products formed at the contacting surfaces. Various conductive metallic oxides, for example, cupric, cuprous, iron, and vanadium oxides, manganese dioxide and lead peroxide, are suitable as electronegative elements in such service; manganese dioxide, however, is preferred. The limitation is overcome by means of a thin film of an oxide coating, for example, aluminum oxide, disposed over the surface of the aluminum-mercury electrode.

The preferred process for the production of the aluminum alloy electrode is by the immersion of an aluminum plate, from the surface of which has been removed all trace of oil or other foreign substance, in a saturated solution of mercuric chloride, until the amalgamation is sufficiently complete and followed by exposure of the product to the atmosphere to permit the completion of any secondary reaction, after which the surfaces are again cleansed before the application of the oxide coating. This is most satisfactorily formed on the surface of the electrode before assembling of the units by an electro-chemical process.

The assembled rectifying unit, having a film so formed on the aluminum electrode, is substantially unilaterally conductive, or rectifying, without the necessity of first applying an inverse or formation current, its alternating current application being practically constant, without sparking between the coated electrode and the metallic oxide electrode. My method for producing this highly efficient rectifying film consists in subjecting the mercury aluminum electrode to a bath or solution of suitable film forming electrolyte, such as sodium borate, that electrode being the anode in a current path through the solution to a suitable cathode electrode, such as lead, which current is supplied from a suitable source with variable potential. The potential is increased with increasing strength or density of the film, up to a voltage higher than that used in the application of the unit.

Besides being adapted to alternating current rectification, such a couple is equally well adapted for other uses, such as a high capacity condenser and as an automatic cutoff relay in a direct current circuit, as when the potential of a battery or other unit being charged, becomes higher than that of the generator or charging unit.

Referring to the drawing and first to Fig. 1, 1 represents a series of conducting plates, 2 a series of electronegative electrodes, for example, compact manganese dioxide elements, and 3 a series of electropositive electrodes, for example, aluminum-mercury oxide coated elements. At $I_a$ and $I_b$ are alternating current input terminals, while at $O_a$ and $O_b$ are output terminals. For full-wave rectification these couples are arranged in two groups of relatively inverted series, the intervening electrode adjacent elements 3 being adapted to be connected to the positive pole of a battery or other current-consuming device, shown at B, while the negative pole is connected to the outer end plates 1. Bolt N holds the electrodes in contact, it being insulated therefrom by an insulating tube D and end washers 4. By this arrangement it is substantially impossible for inverse current from the current-consuming device to pass through the rectifier. This feature increases the amount of current output since decreasing the inverse current and consequently the heating losses, permits continuous operation of the rectifier. T indicates a stepdown transformer adapted for voltage reduction to a potential suitable for battery charging, G denoting a suitable original source of alternating current supply. A spring washer 5 is preferably provided in the couple to insure substantially constant pressure adapted to compensate for temperature changes.

In operation, as the current is applied to the electrodes, current flows when the aluminum amalgam electrode is the cathode in a direction indicated by arrows $d_1$ and $d_4$; upon reversal of the polarity of the current, it flows as indicated by arrows $d_2$ and $d_3$, thus allowing complete and efficient rectification, and the application of the direct current to the output terminals $O_a$ and $O_b$. The battery receives a charge when the output direct current potential is greater than its own, the current flowing through the circuit. However, should this potential be reduced, the battery will not discharge in the opposite direction because of the practically open circuit resistance of the aluminum amalgam electrode when connected as an anode. This feature is also of great importance when a condenser filter circuit, such, for instance as those used in radio circuits, is being charged.

In Fig. 2, instead of a storage battery connected to the output terminals, a condenser filter circuit is so connected, especially designed for use in radio reception and transmission circuits. $C_a$ and $C_b$ are fixed condensers of 4 mfd. capacity and L is an inductance of 50 henrys.

In operation, the condenser filter circuit is charged in a manner similar to that indicated in Fig. 1, the inductance L, preventing a flow of the pulsating direct current; so that the available output potential from the condenser $C_b$ is steady and direct. By virtue of the inverse connections of the condenser with the rectifier, a condition exists which is similar to that of battery charging, the condenser being unable to discharge back into the rectifier circuit when the rectified potential is lower than the condenser potential or when there are line interruptions.

In Fig. 3, J represents a container for the rectifier device in an oil bath to prevent decomposition of any of the elements by exposure to thermal and moisture conditions and to overcome any tendency of that device to become overheated.

The manganese dioxide electrodes are preferably formed by subjecting the powdered material to very heavy pressure in a mold or die, its resistance decreasing with its compactness. A pressure of one hundred tons per square inch yields a product of very low resistance.

Having described my invention what I claim as new and desire to secure by Letters Patent, is:—

1. An electrical device having an electrode made from metallic material consisting substantially entirely of aluminum having a coating of an oxide electro-chemically produced before the assembly of the elements of said device, and an electrode of manganese dioxide in contact therewith.

2. An article of manufacture comprising a body of aluminum mercury alloy having a coating of an oxide electro-chemically produced in surface contact with a body of manganese dioxide, said bodies being arranged and adapted to be connected as electrodes in an electric circuit.

3. In dry surface-contact rectifying devices and the like, an asymmetric electric couple comprising an electronegative electrode element composed of an electrically conducting metallic oxide and an electropositive electrode element made of metallic aluminum constructed and arranged to cooperate with said metallic oxide.

4. In dry surface-contact rectifying devices and the like, an asymmetric electric couple comprising an electronegative electrode element composed of an electrically conducting metallic oxide and an electropositive electrode element made from metallic material consisting substantially entirely of aluminum formed with an oxide coating.

5. In dry surface-contact rectifying devices and the like, an asymmetric electric couple comprising an electronegative electrode element composed of an electrically conducting metallic oxide and an electropositive electrode element made from metallic aluminum and having an electrochemically produced coating of aluminum oxide.

6. In dry surface-contact rectifying devices and the like, an asymmetric electric couple comprising an electronegative electrode element composed of an electrically conducting metallic oxide and an electropositive electrode element, composed of aluminum amalgam provided with an electrically conducting coating of a metallic oxide.

7. In dry surface-contact rectifying devices and the like, an asymmetric electric couple comprising an electronegative electrode element composed of an electrically conducting metallic oxide and an electropositive electrode element, composed of a compound of aluminum and mercury and provided with an electrically conducting coating of aluminum oxide.

8. In dry surface-contact rectifying devices and the like, an asymmetric electric couple comprising an electropositive electrode element made from metallic aluminum and an electronegative electrode element formed from a compressed powdered electrically conducting metallic oxide.

9. In dry surface-contact rectifying devices and the like, an asymmetric electric couple comprising an electropositive electrode element made from metallic material consisting substantially entirely of aluminum and an electronegative electrode element formed from a maximum valent oxide of a metal of the iron and manganese group.

10. In dry surface-contact rectifying devices and the like, an asymmetric electric couple, comprising an electropositive electrode element formed of aluminum amalgam and having a relatively thin coating of an electrically-conducting metallic oxide and a cooperating electronegative electrode element comprising a relatively dense body of manganese dioxide.

11. In dry surface contact rectifying devices and the like, an asymmetric couple comprising an electropositive electrode element formed of aluminum and mercury having an electrochemically produced coating of aluminum oxide and a cooperating electronegative electrode element comprising a relatively dense body of manganese dioxide.

12. As an electrode element adapted for use in dry surface-contact rectifying devices and the like, a disk-like body of dense pulverulent manganese dioxide retained by adhesion due to the application of relatively great pressure.

13. A dry cell rectifier for alternating current, comprising an electrode of a highly compressed and conducting powder compound of an electropositive and an electronegative element.

14. A dry cell rectifier for alternating current, comprising an electrode of a conducting powder compound of an electropositive and an electronegative element, a metal electrode cooperating therewith, and means to exert an intense pressure thereon.

15. A dry cell rectifier for alternating current, comprising an electrode of a conducting powder compound of an electropositive and an electronegative element, a metal electrode cooperating therewith, and resilient means to exert and maintain throughout the life of the cell a pressure thereon in excess of the minimum necessary for satisfactory operation.

Signed at New York in the county of New York and State of New York this 8th day of December, A. D. 1924.

SAMUEL RUBEN.